United States Patent
Liu et al.

(10) Patent No.: US 10,551,908 B2
(45) Date of Patent: Feb. 4, 2020

(54) EMOTICON INPUT METHOD AND DEVICE

(71) Applicant: KIKA TECH (CAYMAN) HOLDINGS CO., LIMITED, Beijing (CN)

(72) Inventors: Anna Liu, Beijing (CN); Yao Yao, Beijing (CN)

(73) Assignee: KIKA TECH (CAYMAN) HOLDINGS CO., LIMITED, Beijing (CN)

( * ) Notice: Subject to any disclaimer, the term of this patent is extended or adjusted under 35 U.S.C. 154(b) by 0 days.

(21) Appl. No.: 15/871,209

(22) Filed: Jan. 15, 2018

(65) Prior Publication Data
US 2019/0018476 A1 Jan. 17, 2019

(30) Foreign Application Priority Data
Jul. 14, 2017 (CN) .......................... 2017 1 0575583

(51) Int. Cl.
*G06F 3/01* (2006.01)
*G06F 17/21* (2006.01)
*G06F 16/35* (2019.01)
*G06F 17/27* (2006.01)
*G06F 3/023* (2006.01)

(52) U.S. Cl.
CPC ............. *G06F 3/01* (2013.01); *G06F 3/0233* (2013.01); *G06F 3/0236* (2013.01); *G06F 3/0237* (2013.01); *G06F 16/35* (2019.01); *G06F 17/21* (2013.01); *G06F 17/276* (2013.01)

(58) Field of Classification Search
CPC .... G06F 3/0237; G06F 17/2735; G06F 17/30; G06F 3/0236; G06F 3/04842; G06F 3/018
See application file for complete search history.

(56) References Cited

U.S. PATENT DOCUMENTS

2013/0339983 A1* 12/2013 Dai .................. H04M 1/72569
  719/318
2016/0224687 A1* 8/2016 Kurabayashi ....... G06F 17/2223

* cited by examiner

*Primary Examiner* — Gerald Johnson
(74) *Attorney, Agent, or Firm* — Anova Law Group, PLLC

(57) ABSTRACT

An emoticon input method and device are provided. The method includes: when an emoticon input instruction is received, displaying emoticon combinations on an emoticon page according to recorded frequencies of use of the emoticon combinations, where each of the emoticon combinations including at least two emoticons; and according to a received emoticon combination selection instruction, inputting an emoticon combination corresponding to the emoticon combination selection instruction.

10 Claims, 2 Drawing Sheets

If it is detected that a user inputs an emoticon combination, calculate and update the frequency of use of the emoticon combination to a local storage space — 210

If the emoticon input instruction is received, read emoticon combinations stored in the local storage space into a memory — 220

Present on the emoticon page the emoticon combinations in a descending order of the frequencies of use of the emoticon combinations — 230

According to a received emoticon combination selection instruction, input an emoticon combination corresponding to the emoticon combination selection instruction — 240

According to a currently input emoticon combination, update the frequency of use of the emoticon combination — 250

EMOTICON INPUT METHOD AND DEVICE

CROSS-REFERENCES TO RELATED APPLICATIONS

This application claims the priority of Chinese Patent Application No. 201710575583.4 filed on Jul. 14, 2017, the entire contents of which are incorporated herein by reference.

TECHNICAL FIELD

The present disclosure relates to the field of communication technologies and, more particularly, to an emoticon input method and device.

BACKGROUND

With the rapid development and popularization of network and communication technologies, the way of communications realized through networks become more frequent and important in people's daily life. Recently, in addition to traditional literal expressions, emoticons such as emoji have been used as another "language" for communication and become more and more popular. Emoticons are particularly preferred by young network users for expression of their opinions, emotions, attitude and so on. In order to fulfill users' expression needs, existing input method products are provided with entries to emoticons for the users to select desired emoticons. In order to further improve user experience, existing input method products can record emoticons which are frequently used by the users to establish a list of frequently-used emoticons, and display the frequently used emoticons through display devices of mobile terminals. Thus, the users can conveniently find emoticons which they want from the frequently-used emoticons.

However, when a user expresses himself or herself using emoticons, he or she tends to input a sequence or combination of emoticons to strength tones or emotions, etc. For example, when a user wants to indicate the cooperation is pleasant, he or she may continuously input emoticons such as "handshake" plus "thumb-up" plus "tea" to show thankfulness or appreciation to his or her partner. For the input of such type of emoticon combination or sequence, the user needs to continuously input a plurality of emoticons, and spends a lot of time on input of each emoticon. This obviously results in reduced input efficiency and lowered user experience.

SUMMARY

In view of the above, the present disclosure provides an emoticon input method and a corresponding emoticon input device to overcome at least a part of the above problems.

According to one aspect of the present disclosure, there is provided an emoticon input method, including steps of:
  when an emoticon input instruction is received, displaying on an emoticon page emoticon combinations according to recorded frequencies of use of the emoticon combinations, where each of the emoticon combinations includes at least two emoticons; and
  according to a received emoticon combination selection instruction, inputting an emoticon combination corresponding to the emoticon combination selection instruction.

According to another aspect of the present disclosure, there is provided an emoticon input device, including:

an emoticon displaying module configured to, when an emoticon input instruction is received, display on an emoticon page emoticon combinations according to recorded frequencies of use of the emoticon combinations, where each of the emoticon combinations includes at least two emoticons; and an emoticon input module configured to, according to a received emoticon combination selection instruction, input an emoticon combination corresponding to the emoticon combination selection instruction.

In the emoticon input method of the present disclosure, when an emoticon input instruction is received, emoticon combinations can be displayed on an emoticon page according to recorded frequencies of use of the emoticon combinations, where each of the emoticon combinations includes at least two emoticons; and according to a received emoticon combination selection instruction, an emoticon combination corresponding to the emoticon combination selection instruction is input. Thus, the present disclosure can solve the problem in existing emoticon input method that input efficiency is relatively low when inputting emoticon combinations, which causes lowered input experience of the user experience. Consequently, the present disclosure can improve the input efficiency of emoticon combination and thus enhance the user's input experience.

BRIEF DESCRIPTION OF THE DRAWINGS

Other advantages and benefits will become clear to those ordinarily skilled in the relevant art through a reading of the detailed description of the exemplary embodiments provided hereinafter. Drawings are used for illustrating exemplary embodiments but are not intended to limit the present disclosure. Throughout the drawings, the same reference numerals represent the same elements.

DETAILED DESCRIPTION

Figure 1:
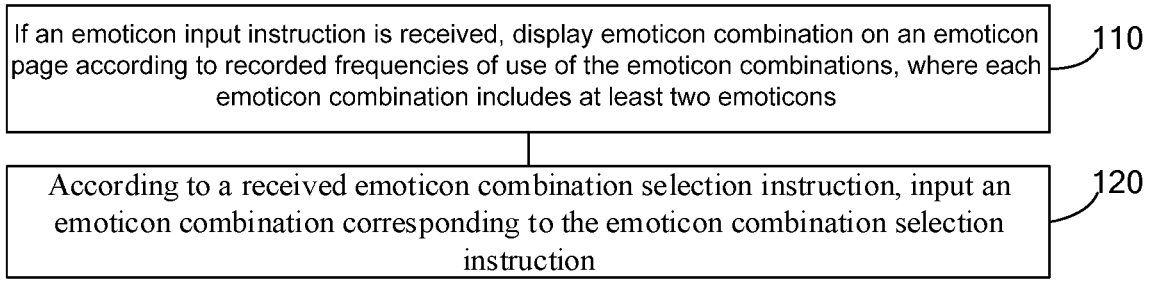
FIG. 1 is a flowchart showing an emoticon input method according to an embodiment of the present disclosure.

Exemplary embodiments of the present disclosure will be described below in detail with reference to accompanying drawings. Although the exemplary embodiments of the present disclosure are presented in the drawings, it should be understood that the present disclosure can be implemented in various manners without being limited to the embodiments set forth herein. On the contrary, the embodiments are provided to facilitate understanding of the present disclosure and to fully convey the scope of the present disclosure to those skilled in this art.

First Embodiment

An emoticon input method according to an embodiment of the present disclosure will be described below in detail.

FIG. 1 is a flowchart showing an emoticon input method according to an embodiment of the present disclosure.

In step 110, if an emoticon input instruction is received, emoticon combinations are displayed on an emoticon page according to recorded frequencies of use of the emoticon combinations. Each of the emoticon combinations may include at least two emoticons.

As previously stated, in practical applications, when a user sends a message, he or she may use a combination of emoticons to express emotions, attitudes, tones and so on. Existing emoticon pages only display individual emoticons according to the frequencies of use of the emoticons. When a plurality of emoticons are inputted continuously using existing emoticon input methods, individual emoticons need to be respectively selected from the emoticon page. For example, if the user wants to input an emoticon combination "" using existing input approaches, the user needs to select the emoticon "" twice from the emoticon page. Such operation is cumbersome and time consuming.

In order to improve the efficiency and convenience for the user to input emoticon combinations, both the emoticon combinations and frequencies of use of the emoticon combinations may be recorded. When an emoticon input instruction is received, the emoticon combinations can be displayed on an emoticon page according to the recorded frequencies of use of the emoticon combinations. In this way, if the user wants to input an emoticon combination, the user can select the desired emoticon combination, for example, directly from the emoticon page.

Further, the user can input the emoticon input instruction by any available manners. Specific manners can be preset depending on actual demands, and embodiments of the present disclosure do not impose specific limitations on this. Further, in order to prevent the emoticon from affecting the visual effect and any operation of the user when the user has no intend to input emoticon, the emoticon page may be triggered upon receiving the emoticon input instruction, and the emoticon combinations are presented on the emoticon page according to the recorded frequencies of use of the emoticon combinations.

Further, after the emoticon input instruction is received, when an emoticon combination selection instruction is received, that is, the user selects an emoticon or an emoticon combination from the emoticon page, the emoticon page may not be displayed any more. When a next emoticon input instruction is received, the emoticon page may be displayed again. The specific form for displaying the emoticons or emoticon combinations on the emoticon page may be preset depending on actual demands, and embodiments of the present disclosure do not impose specific limitations on this.

In one embodiment, a mixture of both individual emoticons and emoticon combinations can be displayed on the emoticon page. For example, the individual emoticons and emoticon combinations can be displayed according to a descending order of the frequencies of use of the individual emoticons and emoticon combinations, so that the user may select a single emoticon or an emoticon combination including at least two emoticons for input according to his or her demands. The individual emoticons and emoticon combinations may also be displayed according to other principles, specific principles for displaying the individual emoticons and emoticon combinations may be set before step 110 or before any step before step 110, and the present disclosure is not limited thereto.

In another embodiment, a plurality of layers are constructed on the emoticon page, and one layer is displayed on the emoticon page given a certain moment. Further, the individual emoticons may be displayed on one layer, and the emoticon combinations may be displayed on another layer.

Further, selection controls for each layer may be configured on the emoticon page. When the user triggers one of the selection controls, the contents displayed on the emoticon page can be switched to the layer corresponding to the triggered selection control.

In another embodiment, the emoticon page may be divided into two sub-pages, one of the sub-pages shows individual emoticons and the other one of the sub-pages shows the emoticon combinations. Further, two or more of the aforementioned approaches may be combined to display the individual emoticon combinations or emoticons. As such, the specific manner for displaying a single emoticon or a single emoticon combination on the emoticon page can be preset depending on actual demands, and embodiments of the present disclosure do not impose specific limitations on this.

Further, if the emoticon page cannot show all of the emoticons or emoticon combinations, a sliding bar may be set on the emoticon page, so that the user may control the display of the emoticons or emoticon combinations on the emoticon page by moving the slider of the sliding bar. Accordingly, the user can view all of the emoticon combinations and individual emoticons, and select desired emoticon combination or emoticon.

Further, in practical applications, the emoticon combination input by the user may include too many emoticons and the length of the emoticon combination may exceed the range of the emoticon page. In view of this, the number of the emoticons included in an emoticon combination may be configured not to exceed a preset value N, where N is a positive integer. The value of N can be set depending on actual demands or the size of the emoticon page for displaying the emoticon combinations, and embodiments of the present disclosure do not impose specific limitations on this. If the number of the emoticons included in the emoticon combination input by the user exceeds the preset value N, N consecutive emoticons in the emoticon combination can be taken as the emoticon combination which needs to be recorded.

For example, if the preset value N equals 20, and 21 emoticons are included in the emoticon combination input by the user, the emoticon combination formed by the top 20 emoticons may be recorded. Alternatively, emoticon combinations consisting of any 20 consecutive emoticons may be recorded. Embodiments of the present disclosure do not impose specific limitations on this.

Further, in order to show whether an emoticon is an individual emoticon or belongs to an emoticon combination on the emoticon page that enables the user to accurately select desired emoticons, the relationship between the emoticons included in the same emoticon combination may be differentiated from the space between the emoticons belonging to different emoticon combinations.

For example, on the emoticon page, the relationship between emoticons belonging to the same emoticon combination may be configured to be without spacing, and the emoticons in different emoticon combinations may be spaced apart by a blank character. In one specific implementation, when " " is displayed on the emoticon page, there is no space between the first two emoticons " " indicating that " " belongs to the same emoticon combination; and " " is an individual emoticon. The relationship between the emoticons in the same emoticon combination and the spacing between the emoticons belonging to different emoticon combinations may be preset depending on actual demands and embodiments of the present disclosure do not impose specific limitations on this.

Further, it should be noted that, the format of the emoticon combinations input by the user is fixed, irrelevant of the relationship between the emoticons in the same emoticon combination. That is, the format of the emoticon combinations input by the user has no direct relation to the relationship between the emoticons in the same emoticon combination, and no connection symbols other than the emoticons may be input. For example, if the connection symbol "&" exists between the emoticons in the same emoticon combination, when the user selects from the emoticon page the emoticons "▒"& "▒", the emoticons inputted are "▒▒", which does not include the connection symbol "&".

In step 120, according to a received emoticon combination selection instruction, an emoticon combination corresponding to the emoticon combination selection instruction is input.

The user may input an emoticon combination selection instruction on the emoticon page. For example, the user may tap the area where an emoticon combination is located to input the emoticon combination selection instruction for the emoticon combination. Other available approaches may also be applied to input the emoticon combination selection instruction, the specific manner can be preset depending on actual demands, and embodiments of the present disclosure do not impose specific limitations on this.

The user may select any emoticon combination by inputting the emoticon combination selection instruction, and then the selected emoticon combination can be input. For example, if the user inputs a selection instruction of an individual emoticon on the emoticon page, the selected individual emoticon may be input, and embodiments of the present disclosure do not impose specific limitations on this.

In the emoticon input method of the present disclosure, when an emoticon input instruction is received, emoticon combinations can be displayed on an emoticon page according to recorded frequencies of use of the emoticon combinations and each of the emoticon combinations includes at least two emoticons; and according to a received emoticon combination selection instruction, an emoticon combination corresponding to the emoticon combination selection instruction is input. Thus, the present disclosure can improve the input efficiency of emoticon combination and accordingly enhance the user experience.

Second Embodiment

Another emoticon input method according to an embodiment of the present disclosure will be described below in detail.

Figure 2:
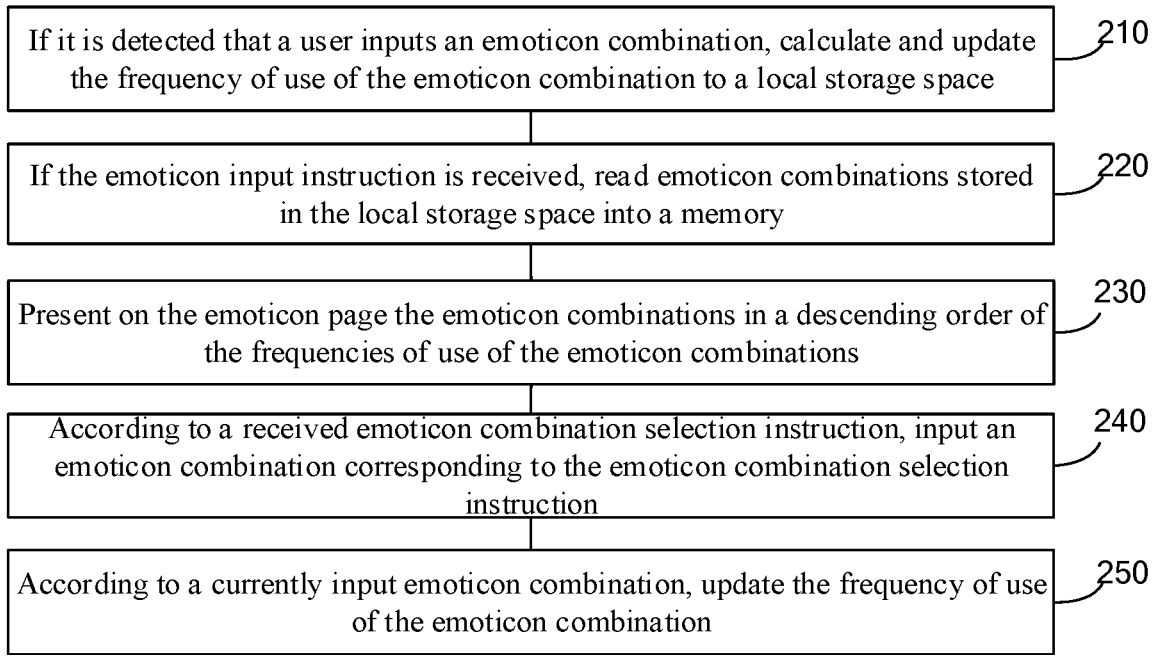
FIG. 2 is a flowchart showing another emoticon input method according to an embodiment of the present disclosure.

FIG. 2 is a flowchart showing an emoticon input method according to an embodiment of the present disclosure.

In step 210, when it is detected that a user inputs an emoticon combination, the frequency of use of the emoticon combination is calculated and updated to a local storage space.

In the embodiment of the present disclosure, the frequencies of use of the emoticon combinations input by a user need to be calculated so as to display the emoticon combinations according to the frequencies of use. When it is detected a user inputs an emoticon combination, the frequency of use of the emoticon combination is calculated and updated to a local storage space. The calculated frequencies of use of the emoticon combinations can also be saved in other available storage space, such as a cloud storage space, a memory and the like, depending on actual demands, and embodiments of the present disclosure do not impose specific limitations on this.

Further, in embodiments of the present disclosure, if single emoticons need to be displayed on the emoticon page, the frequency of use of a single emoticon needs to be calculated and updated to the local storage space when it is detected that the user inputs the single emoticon. The specific calculation and updating manners may be set in a similar way to that of the emoticon combinations and repeated descriptions are omitted here.

In embodiments of the present disclosure, it is possible to use any data structure to store the emoticon combinations and the frequencies of use of the emoticon combinations depending on actual demands, and embodiments of the present disclosure do not impose specific limitations on this. For example, when the user completes a single-time input, the text input by the user may be checked. The text input by the user may include both characters and emoticons, such as the sentence "it is a sunny ▒▒ day". This sentence includes both characters and emoji emoticons. If a text includes an emoticon combination including a plurality of emojis, the emoticon combination may be stored into a data structure, such as map<String, integer>, and a value may be used to record the frequency of use of such emoticon combination.

Optionally, in embodiments of the present disclosure, step 210 may further include sub-steps 211 to 213.

In sub-step 211, if it is detected that a user inputs an emoticon combination, whether the emoticon combination matches a recorded emoticon combination is determined.

In embodiments of the present disclosure, the emoticon combination currently input by the user may be an emoticon combination which has been input by the user before, or an emoticon combination input by the user for the first time. If the emoticon combination currently input by the user is an emoticon combination which has been input by the user before, the emoticon combination currently input by the user has been recorded before; that is, the currently input emoticon combination matches a recorded emoticon combination. Under such situation, the frequency of use of the currently input emoticon combination may be directly updated based on the current input.

If the emoticon combination currently input by the user is an emoticon combination input by the user for the first time, that is, the currently input emoticon combination does not match any recorded emoticon combination, the emoticon combination and the frequency of use of the emoticon combination may be recorded. The frequency of use of an emoticon combination may refer to the frequency of use of the emoticon combination within a preset time period from a previous time point to the current time point. The preset time period may be set prior to the sub-step 211, or before any step prior to sub-step 211, and embodiments of the preset disclosure do not impose specific limitations on this. For example, the present time period may be one day, if an emoticon combination "▒▒" is used for 10 times within such preset time period, the frequency of use of the emoticon "▒▒" is then 10 times per day.

Further, in one embodiment, the number of times an emoticon combination is input within the preset time period from a previous time point to the current time point may be used as the frequency of use. In another embodiment, the total number of times an emoticon combination is input from the time point when the emoticon combination is firstly input to the current time point may be used as the frequency of use of the emoticon combination. Specific manners may depend on actual demands, and embodiments of the present disclosure do not impose any limitations on this.

In sub-step 212, if the emoticon combination matches a recorded emoticon combination, the frequency of use of the emoticon combination is updated.

In sub-step 213, if the emoticon combination does not match any recorded emoticon combination, the emoticon combination and the frequency of use of the emoticon combination are recorded.

In step 220, if the emoticon input instruction is received, emoticon combinations stored in the local storage space are read and stored in a memory.

In order to display emoticon combinations on the emoticon page, when the emoticon input instruction is received, recorded emoticon combinations and frequencies of use thereof may be read and stored in a memory. Alternatively, if the recorded emoticon combinations and the frequencies of use thereof are stored in the memory, no reading of the recorded emoticon combinations and the frequencies of use thereof is needed. Instead, when the emoticon input instruction is received, the emoticon combinations stored in the memory are directly displayed on the emoticon page according to a descending order of the frequencies of use of the emoticon combinations.

In step 230, the emoticon combinations are displayed on the emoticon page in a descending order of the frequencies of use of the emoticon combinations.

In practical applications, in order to facilitate the user to conveniently select a desired emoticon combination, preference may be given to the emoticon combinations which are frequently used by the user, that is, the emoticon combinations which are frequently used by the user may be displayed at positions which can be easily seen by the user. Thus, in one embodiment, the emoticon combinations may be displayed on the emoticon page in a descending order of the frequencies of use of the emoticon combinations. Further, if individual emoticons are also displayed on the emoticon page, the emoticon combinations and emoticons may be displayed on the emoticon page in a mixed manner based on a descending order of the frequencies of use of the emoticon combinations and the emoticons.

In another embodiment, the emoticon combinations may be displayed on the emoticon page in a descending order of the frequencies of use of the emoticon combinations, and the emoticons may be further displayed on the emoticon page in a descending order of the frequencies of use of the individual emoticons. Alternatively, the individual emoticons may be displayed on the emoticon page in a descending order of the frequencies of use of the individual emoticons, and then the emoticon combinations may be displayed on the emoticon page in a descending order of the frequencies of use of the emoticon combinations. Specific displaying manner may be preset depending on actual demands, and embodiments of the present disclosure do not impose specific limitations on this.

For example, as stated previously, if an emoticon combination is recorded using a data structure map<String, integer> and the frequency of use of the emoticon combination is recorded using a data structure value, the locally stored map may be read into the memory. Further, the emoticon combinations may be ranked based on the frequencies of use of the emoticon combinations stored in value for display on the emoticon page.

In step 240, according to a received emoticon combination selection instruction, the emoticon combination corresponding to the emoticon combination selection instruction is input.

In step 250, according to a currently input emoticon combination, the frequency of use of the emoticon combination is updated.

If the user currently inputs any emoticon combination, in order to ensure the accuracy of the frequency of use of the emoticon combination, the frequency of use of the emoticon combination may be updated according to the currently input emoticon combination. Accordingly, if the user currently inputs a single emoticon, the frequency of use of the single emoticon may be updated according to the currently input single emoticon.

As such, in the disclosed emoticon input method, when an emoticon input instruction is received, emoticon combinations can be displayed on an emoticon page according to recorded frequencies of use of the emoticon combinations and each of the emoticon combinations includes at least two emoticons. Further, according to a received emoticon combination selection instruction, an emoticon combination corresponding to the emoticon combination selection instruction is input. Thus, the present disclosure can improve the input efficiency of emoticon combination and accordingly enhance the user experience.

Further, in embodiments of the present disclosure, when a user is detected to input an emoticon combination, the frequency of use of the emoticon combination is calculated and updated to a local storage space. Further, when it is detected that a user inputs an emoticon combination, whether the emoticon combination matches a recorded emoticon combination is determined. If the emoticon combination matches a recorded emoticon combination, the frequency of use of the emoticon combination is updated; and if the emoticon combination does not match any recorded emoticon combination, the emoticon combination and the frequency of use of the emoticon combination are recorded. Thus, the accuracy of the frequencies of use of the emoticon combinations can be improved.

In addition, in embodiments of the present disclosure, if the emoticon input instruction is received, emoticon combinations stored in the local storage space are read into a memory. The emoticon combinations are displayed on the emoticon page in a descending order of the frequencies of use of the emoticon combinations. This can improve the displaying effect of the emoticon combinations and accordingly input efficiency of the user and enhance the user experience.

Further, in embodiments of the present disclosure, according to a currently input emoticon combination, the frequency of use of the emoticon combination may be updated. This can also further improve the accuracy of the frequencies of use of the emoticon combinations.

For ease of description, the method embodiments are described as a combination of steps. Those skilled in the relevant art should understand that the present disclosure is not limited to the sequence of the steps described herein. The steps in embodiments of the present disclosure may be performed in other sequences or orders or may be carried out simultaneously. Further, those skilled in this art should understand that the embodiments described herein are only for illustrative purposes, and the steps involved in the exemplary embodiments are not necessarily needed in all embodiments.

Third Embodiment

An emoticon input device according to an embodiment of the present disclosure will be described below in detail.

Figure 3:
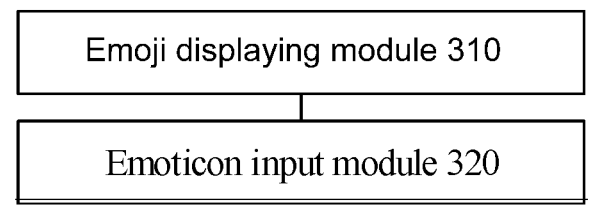
FIG. 3 is a block diagram showing an emoticon input device according to an embodiment of the present disclosure.

FIG. 3 is a block diagram showing an emoticon input device according to an embodiment of the present disclosure.

The emoticon input device includes an emoticon displaying module 310 and an emoticon input module 320.

The emoticon displaying module 310 is configured to, when an emoticon input instruction is received, display on an emoticon page emoticon combinations according to recorded frequencies of use of the emoticon combinations. Each of the emoticon combinations includes at least two emoticons.

The emoticon input module 320 is configured to, according to a received emoticon combination selection instruction, input an emoticon combination corresponding to the emoticon combination selection instruction.

the disclosed emoticon input device may implemented the aforementioned emoticon input method, in which: when an emoticon input instruction is received, emoticon combinations can be displayed on an emoticon page according to recorded frequencies of use of the emoticon combinations, where each of the emoticon combinations includes at least two emoticons. Further, according to a received emoticon combination selection instruction, an emoticon combination corresponding to the emoticon combination selection instruction is input. Thus, the present disclosure can improve the input efficiency of emoticon combination and accordingly enhance the user experience.

Fourth Embodiment

An emoticon input device according to an embodiment of the present disclosure will be described below in detail.

Figure 4:
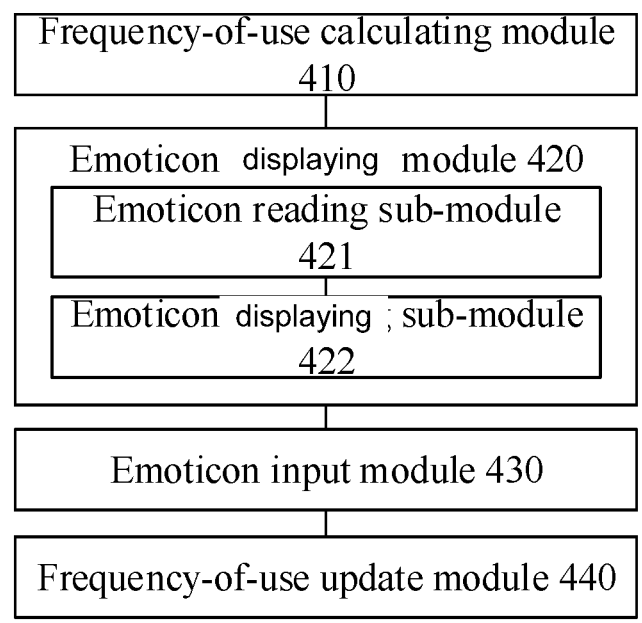
FIG. 4 is a block diagram showing another emoticon input device according to an embodiment of the present disclosure.

FIG. 4 is a block diagram showing an emoticon input device according to an embodiment of the present disclosure. As shown in FIG. 4, the device may include a frequency-of-use calculating module 410, an emoticon displaying module 420, an emoticon input module 430, and a frequency-of-use update module 440.

The frequency-of-use calculating module 410 is configured to, if it is detected that a user inputs an emoticon combination, calculate and update the frequency of use of the emoticon combination to a local storage space.

Optionally, in one embodiment, the frequency-of-use calculating module 410 may include a determination sub-module, an update sub-module and a recording sub-module.

The determination sub-module is configured to, if it is detected that a user inputs an emoticon combination, determine whether the emoticon combination matches a recorded emoticon combination.

The update sub-module is configured to, if the emoticon combination matches a recorded emoticon combination, update the frequency of use of the emoticon combination.

The recording sub-module is configured to, if the emoticon combination does not match any recorded emoticon combination, record the emoticon combination and the frequency of use of the emoticon combination.

The emoticon displaying module 420 is configured to, if an emoticon input instruction is received, display emoticon combinations on an emoticon page according to recorded frequencies of use of the emoticon combinations, where each of the emoticon combinations includes at least two emoticons.

Optionally, in embodiments of the present disclosure, the emoticon displaying module 420 may include an emoticon reading sub-module 421 and an emoticon displaying sub-module 422.

The emoticon reading sub-module 421 is configured to, when the emoticon input instruction is received, read emoticon combinations stored in the local storage space into a memory.

The emoticon displaying sub-module 422 is configured to display on the emoticon page the emoticon combinations in a descending order of the frequencies of use of the emoticon combinations.

The emoticon input module 430 is configured to, according to a received emoticon combination selection instruction, input an emoticon combination corresponding to the emoticon combination selection instruction.

The frequency-of-use update module 440 is configured to, according to a currently input emoticon combination, update the frequency of use of the emoticon combination.

The disclosed emoticon input device may implement the aforementioned emoticon input method, in which, when an emoticon input instruction is received, emoticon combinations can be displayed on an emoticon page according to recorded frequencies of use of the emoticon combinations, where each of the emoticon combinations includes at least two emoticons. Further, according to a received emoticon combination selection instruction, an emoticon combination corresponding to the emoticon combination selection instruction is input. Thus, the present disclosure can improve the input efficiency of emoticon combination and accordingly enhance the user experience.

Further, the disclosed emoticon input device may be further applied to, when it is detected that a user inputs an emoticon combination, calculate and update the frequency of use of the emoticon combination to a local storage space. Further, when it is detected that a user inputs an emoticon combination, whether the emoticon combination matches a recorded emoticon combination is determined. If the emoticon combination matches a recorded emoticon combination, the frequency of use of the emoticon combination is updated; and if the emoticon combination does not match any recorded emoticon combination, the emoticon combination and the frequency of use of the emoticon combination are recorded. Thus, the accuracy of the frequencies of use of the emoticon combinations can be improved.

Further, the disclosed emoticon input device may be further applied to, when the emoticon input instruction is received, read emoticon combinations stored in the local storage space into a memory. The emoticon combinations are displayed on the emoticon page in a descending order of the frequencies of use of the emoticon combinations. This can improve the displaying effect of the emoticon combinations and the input efficiency of the user, thereby enhancing the user experience.

Further, the disclosed emoticon input device may be further applied to, according to a currently input emoticon combination, update the frequency of use of the emoticon combination. This can also improve the accuracy of the frequencies of use of the emoticon combinations.

The details about the device embodiments are similar to the method embodiments, and the descriptions regarding such device embodiments are thus relatively simple. Accordingly, more specific details of the device embodiments can be found in the related descriptions of the method embodiments.

The algorithms and displays provided herein are not inherently relevant to any particular computer, virtual system, or other devices. Various general-purpose systems can also be used with teaching provided herein. According to the above description, the structure required to construct such a system is obvious. In addition, the present invention is not directed to any particular programming language. It will be appreciated that the present disclosure may be embodied in various programming languages and that the foregoing description of a particular language is intended to disclose the best mode of the present disclosure.

A number of specific details are described herein. It should be understood, however, that the embodiments of the present disclosure may be practiced without these specific details. In some instances, well-known methods, structures, and techniques have not been shown in detail so as not to obscure the understanding of this specification.

Similarly, it is to be understood that the features of the present invention are sometimes grouped together into a single embodiment, drawing or description thereof in order to simplify the disclosure and to assist in understanding one or more of the various inventive aspects, as described above in the exemplary embodiments of the present disclosure. However, the disclosed method shall not be construed as reflecting the intention that the claimed invention claims more features than those identified in each of the claims. More specifically, as reflected in the following claims, the inventive aspect is less than all the features of the previously disclosed single embodiment. Accordingly, the claims that follow the specific embodiments are expressly incorporated into this particular embodiment, where each claim itself is taken as a separate embodiment of the invention.

Those skilled in the art can understand that the modules in a device embodiment may be adaptively changed and placed in one or more devices that are different from the embodiment. The modules or units or components in the embodiments may be combined into a module or unit or component, and in addition they may be divided into a plurality of sub-modules or subunits or subcomponents. All of the features disclosed in this specification (including the accompanying claims, abstract and drawings) and any of the methods disclosed herein, or any of the processes or units of the devices disclosed herein, may be combined, except that at least some of such features and/or the processes or units are mutually exclusive. Each feature disclosed in this specification (including the accompanying claims, abstract and drawings) may be replaced by alternative features that provide the same, equivalent or similar purpose, unless otherwise stated.

In addition, it will be understood by those skilled in the art that although some of the embodiments described herein include certain features included in other embodiments, combinations of the features of different embodiments are intended to be within the scope of the present disclosure and can form different embodiments. For example, in any of the following claims, any one of the claimed embodiments may be used in any combination.

The various component embodiments of the present disclosure may be implemented in hardware, or implemented in software modules running on one or more processors, or in a combination thereof. It will be appreciated by those skilled in the art that some or all of the functions or some or all of the elements of an emoticon input device according to an embodiment of the present invention may be implemented in practice using a microprocessor or a digital signal processor (DSP). The present disclosure may also be implemented as a part or all of devices or device programs (e.g., computer programs and computer program products) for performing the methods described herein. Such a program for implementing the present disclosure may be stored in a computer-readable medium or may have the form of one or more signals. Such signals may be downloaded from an Internet web site, either on a carrier signal or in any other form.

It is to be noted that the above-described embodiments illustrate the present disclosure and are not to be construed as limiting the present disclosure, and that one skilled in the art may devise alternative embodiments without departing from the scope of the appended claims. In the claims, any reference signs between parentheses should not be construed as limiting the claims. The word "comprising" or "including" does not exclude the presence of elements or steps not listed in the claims. The word "a" or "an" before an element does not exclude the presence of multiple such element. The present disclosure may be implemented by means of hardware including several different elements and by means of a suitably programmed computer. In a claim enumerating several devices, several of these devices may be embodied by the same hardware item. The use of the words first, second, and third is not intended to designate any order. These words can be interpreted as names.

What is claimed is:

1. An emoticon input method, applied to a device having one or more processors and a memory for storing instructions executable by the one or more processors, the method comprising:
   in response to receiving an emoticon input instruction, displaying a plurality of individual emoticons on an emoticon page, and displaying a plurality of emoticon combinations on the emoticon page according to recorded frequencies of use of the emoticon combinations, each of the displayed emoticon combinations including at least two emoticons, wherein a spacing between two neighboring displayed emoticons in a same emoticon combination is smaller than a spacing between two neighboring displayed individual emoticons or between two neighboring displayed emoticons from two different emoticon combinations;
   in response to receiving an individual emoticon selection instruction, inputting a selected individual emoticon from the plurality of displayed individual emoticons into an interface; and
   in response to receiving an emoticon combination selection instruction, inputting a selected emoticon combination from the plurality of displayed emoticon combinations into the interface.

2. The method according to claim 1 further comprising:
   in response to detecting that an emoticon combination is inputted, calculating and updating a frequency of use of the inputted emoticon combination to a local storage space.

3. The method according to claim 2, wherein calculating and updating the frequency of the use of the inputted emoticon combination to the local storage space comprises:
   determining whether the inputted emoticon combination matches a recorded emoticon combination;
   if the inputted emoticon combination matches a recorded emoticon combination, updating the frequency of the use of the inputted emoticon combination; and
   if the inputted emoticon combination does not match any recorded emoticon combination, recording the inputted emoticon combination and the frequency of the use of the inputted emoticon combination.

4. The method according to claim 2, wherein displaying the plurality of emoticon combinations on the emoticon page according to the recorded frequencies of the use of the emoticon combinations comprises:
   reading the emoticon combinations stored in the local storage space into the memory; and displaying, on the emoticon page, the plurality of emoticon combinations in a descending order of the frequencies of the use of the emoticon combinations.

5. The method according to claim 1, further comprising:
in response to receiving the emoticon combination selection instruction, after inputting the selected emoticon combination into the interface, updating a frequency of use of the selected emoticon combination.

6. An emoticon input device, comprising:
a memory storing one or more program modules; and
a processor, when executing the one or more program modules stored in the memory, configured to:
in response to receiving an emoticon input instruction, display a plurality of individual emoticons on an emoticon page, and display a plurality of emoticon combinations on the emoticon page according to recorded frequencies of use of the emoticon combinations, each of the displayed emoticon combinations including at least two emoticons, wherein a spacing between two neighboring displayed emoticons in a same emoticon combination is smaller than a spacing between two neighboring displayed individual emoticons or between two neighboring displayed emoticons from two different emoticon combinations;
in response to receiving an individual emoticon selection instruction, input a selected individual emoticon from the plurality of displayed individual emoticons into an interface; and
in response to receiving an emoticon combination selection instruction, input a selected emoticon combination from the plurality of displayed emoticon combinations into the interface.

7. The device according to claim 6, wherein the processor is further configured to:
in response to detecting that an emoticon combination is inputted, calculate and update a frequency of use of the inputted emoticon combination to a local storage space.

8. The device according to claim 7, wherein calculating and updating the frequency of the use of the inputted emoticon combination to the local storage space comprises:
determining whether the inputted emoticon combination matches a recorded emoticon combination;
if the inputted emoticon combination matches a recorded emoticon combination, update the frequency of the use of the inputted emoticon combination; and
if the inputted emoticon combination does not match any recorded emoticon combination, record the inputted emoticon combination and the frequency of the use of the inputted emoticon combination.

9. The device according to claim 7, wherein displaying the plurality of emoticon combinations on the emoticon page according to the recorded frequencies of the use of the emoticon combinations comprises:
reading the emoticon combinations stored in the local storage space into the memory; and
displaying, on the emoticon page, the plurality of emoticon combinations in a descending order of the frequencies of the use of the emoticon combinations.

10. The device according to claim 6, wherein the processor is further configured to:
in response to receiving the emoticon combination selection instruction, after inputting the selected emoticon combination into the interface, update a frequency of use of the selected emoticon combination.

* * * * *